United States Patent [19]
Mantilla

[11] Patent Number: 5,544,445
[45] Date of Patent: Aug. 13, 1996

[54] LANDSCAPE EDGING DEVICE

[76] Inventor: Jose A. Mantilla, 8140 Scootswood Dr., North Charleston, S.C. 29418

[21] Appl. No.: 382,514

[22] Filed: Feb. 1, 1995

[51] Int. Cl.⁶ ............................................ A01G 1/08
[52] U.S. Cl. ................................ 47/33; 404/7; 52/102
[58] Field of Search .......................... 404/7, 8; 47/9, 47/33; 52/102

[56] References Cited

U.S. PATENT DOCUMENTS

| | | | |
|---|---|---|---|
| 4,321,769 | 3/1982 | Tisbo et al. | 47/33 |
| 4,663,883 | 5/1987 | Hilliard et al. | 47/33 |
| 5,157,867 | 10/1992 | Fritch | 52/102 X |
| 5,377,447 | 1/1995 | Fritch | 404/7 X |

FOREIGN PATENT DOCUMENTS 3023309  1/1982  Germany ............................ 47/33

*Primary Examiner*—Michael Powell Buiz
*Assistant Examiner*—James A. Lisehora

[57] ABSTRACT

A landscape edging device which is postioned about a border between a lawn or garden and a structure such as a sidewalk, driveway or building is characterized by a split horizontal member which is capable of downward displacement to allow mowers and other objects to traverse over the device, while providing sufficient height to be an effective barrier between the lawn and the structure. Gripping members are provided to allow the device to be fixed to the lawn.

22 Claims, 2 Drawing Sheets

5,544,445

LANDSCAPE EDGING DEVICE

FIELD OF THE INVENTION

This invention relates to landscape edging devices, and is more particular directed to a landscape edging device having a split horizontal member which retards grass and other vegetation from growing over the edging device to other areas.

BACKGROUND OF THE INVENTION

Grass and other vegetation which borders sidewalks, buildings, fences, and other structures tends to grow over or against such structures. The removal of excess grass and vegetation which borders other structures is known as edging. Various devices have been created to remove the undesired grass or vegetation. Such devices, and the methods for using them, are labor intensive.

The prior art reveals various landscape edging devices which retard the growth of grass or vegetation over sidewalk, driveways, and other structures by creating a barrier between the lawn and garden, and the structure. Many of these devices are characterized by strips which are inserted into the ground about the lawn or garden to form the desired barrier. These devices are permanently affixed to the lawn or garden.

If an edging devices which is affixed to the lawn or garden has substantial height, then it is a safety hazard, in that persons walking along a driveway or sidewalk may trip and fall over the edging strip. If the edging device extends substantially above the lawn, then a mower may not be traversed over the edging device, and a problem is created in mowing the grass which adjoins the barrier. In such a case, mechanical edging devices must be used to remove the vegetation, even though the barrier is present, defeating a reason for the use of edging devices.

Conversely, if the height of the edging device is too low, grass and other vegetation will, in time, grow over the edging device. Grass, such as centipede grass, will readily travel over many of the edging devices found in the prior art. Further, in time, the edging device will become covered with dirt, allowing grass and vegetation to root in the dirt which is covering the edging device.

SUMMARY OF THE PRESENT INVENTION

The present invention is characterized by a split horizontal member which is formed into an elongated strip. The strip is positioned around the perimeter of the lawn or garden adjacent to the sidewalk, driveway, or other structure, thus creating a barrier between the structure and the lawn or garden.

The overall height of the split horizontal member is sufficient to allow a mower to be traversed over the split horizontal member. The split horizontal member allows a downward displacement of the strip as a wheel or body of a mower travels over it, so that the landscape edging device of the present invention does not interfere with mowing. The split horizontal member also retards the growth of grass and other vegetation on and over the device, and the accumulation of dirt over the device.

DETAILED DESCRIPTION OF THE PREFERRED EMBODIMENT

Figure 1:
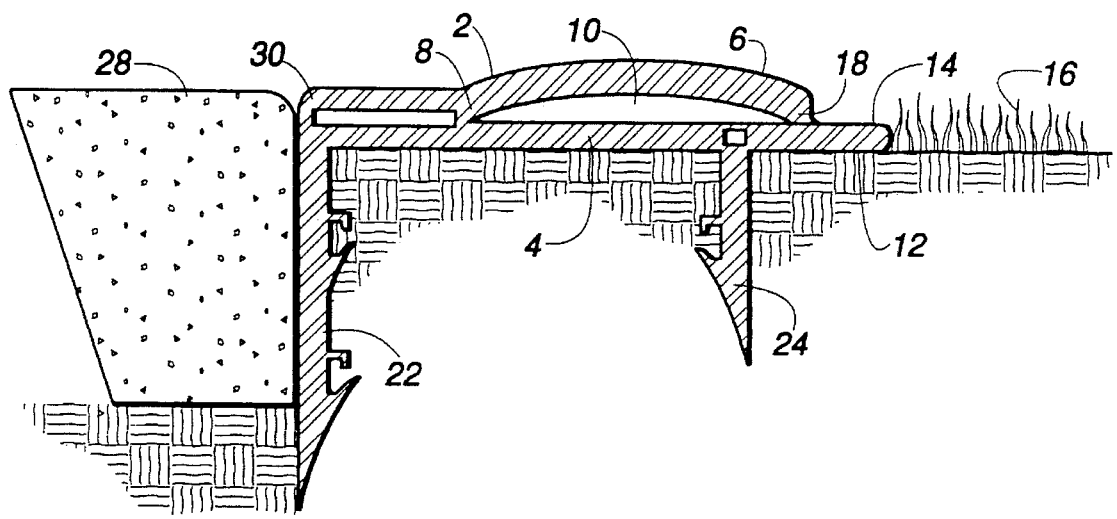
FIG. 1 is a sectioned view of the landscape edging inserted into a lawn adjacent to a sidewalk or driveway.
Figure 2:
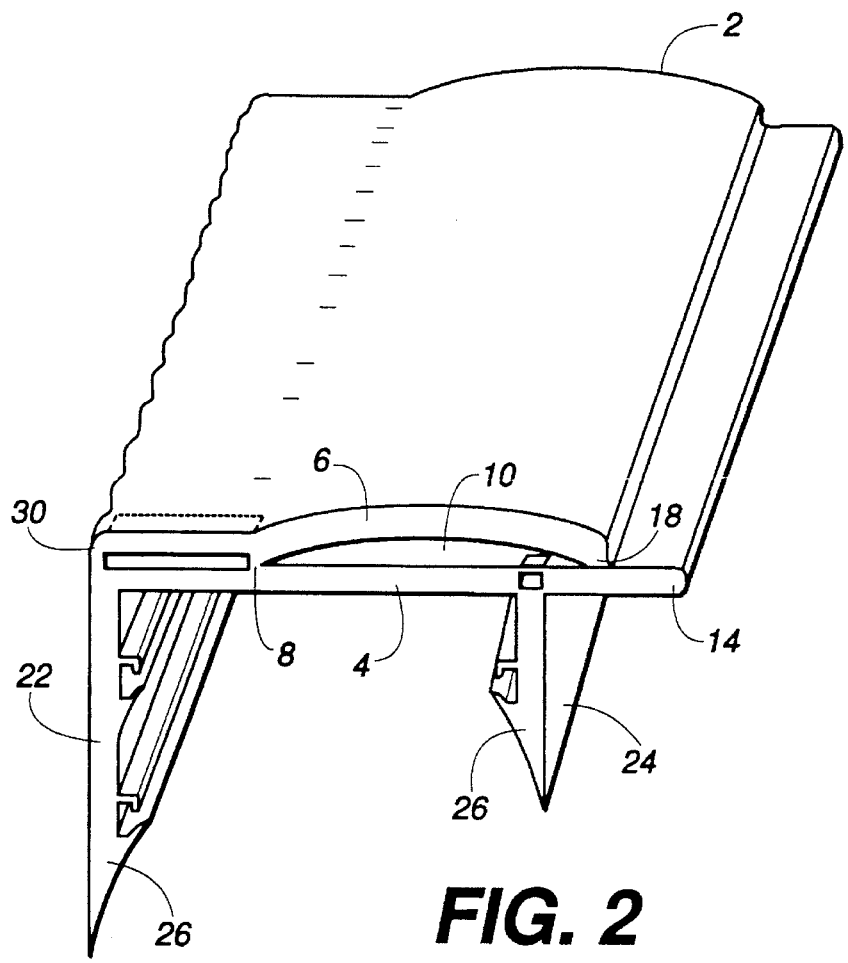
FIG. 2 is a perspective view of a section of the landscape edging device.

Referring now to the drawing figures, FIG. 1 shows a sectioned view of the landscape edging device. The device is characterized by a split horizontal member 2 having a lower flange 4 and an upper leaf 6. The upper leaf is joined to the lower flange at a connecting point 8, and extends above the lower flange so as to form a gap 10 between the upper leaf and the lower flange.

In the preferred embodiment, the lower flange will be generally flat so as to cover the edge of the top surface 12 of the lawn, as demonstrated in FIG. 1. The horizontal lower flange extends beyond the upper leaf at the edge 14 of the split horizontal member which is adjacent to the lawn 16. The upper leaf extends from the connecting point 8 of the upper leaf to the lower flange, and extends above the lower flange, and then descends to adjoin the lower flange. While the upper leaf may adjoin the lower flange at one end 18 of the upper leaf, the end 18 is not connected to the lower flange, so that the upper leaf may be displaced as mowers or other articles traverse or are positioned on top of the landscape edging device of the present invention.

Figure 3:
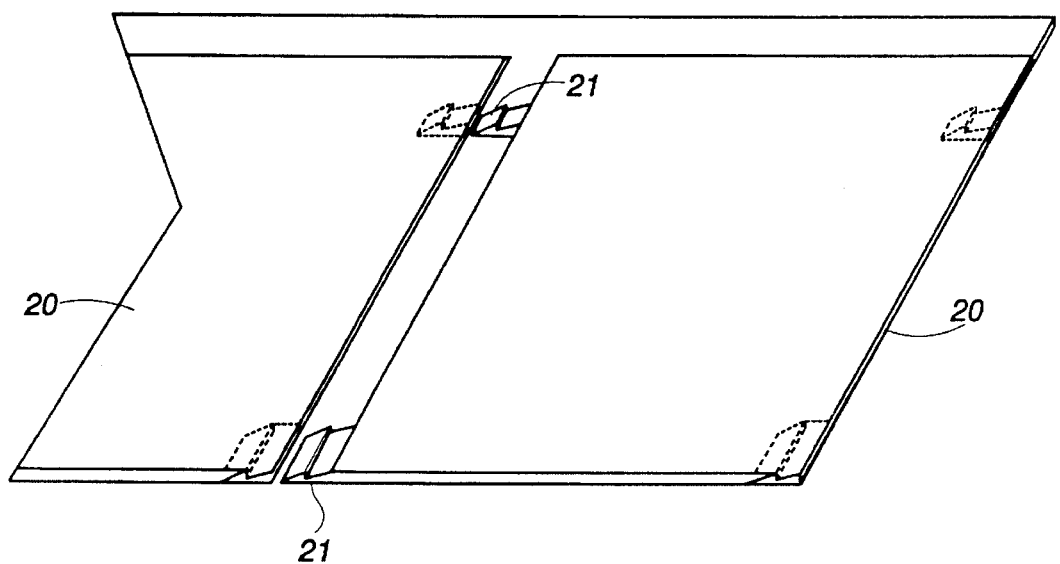
FIG. 3 demonstrates connectors which can be used to connect sections of the landscape edging device.
Figure 4:
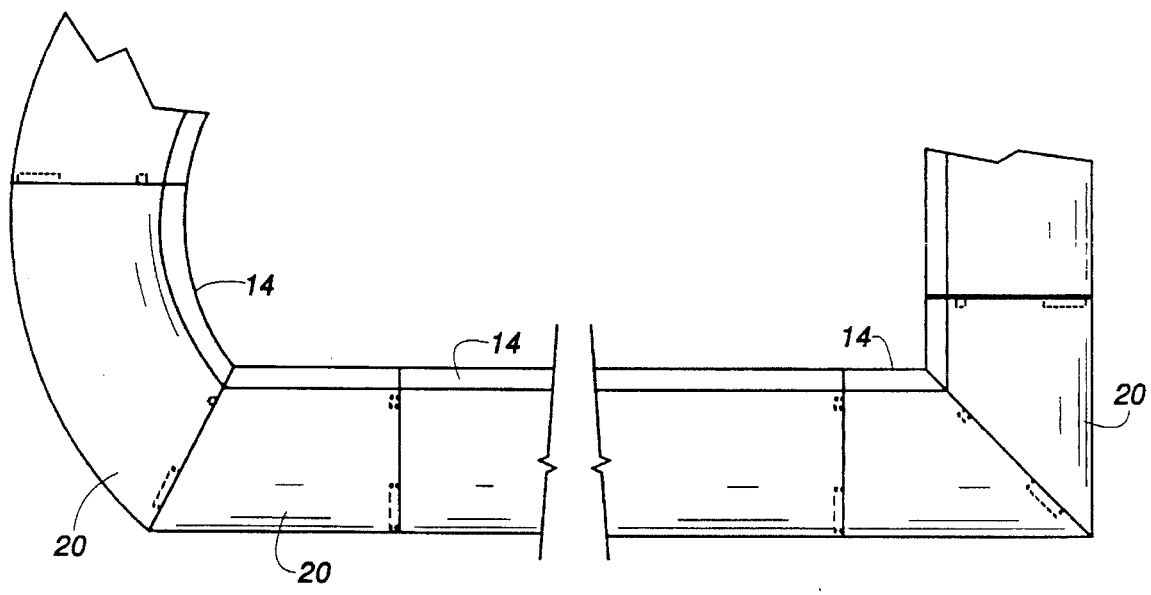
FIG. 4 is a plan view showing sections of the landscape edging device connecting together, including sections having shapes of various angles and curvatures.

In its most common use, the landscape edging device will be formed into strips 20. The strips may be of varying lengths, and of varying angles, and have curved or arcuate shapes as need for the particular application. FIG. 3. These strips are cut to the appropriate length and shape, and if desired, are connected end to end. Connectors 21 may be provided to alignment and facilitate permanent connection of the devices. FIG. 4. The strips may be positioned above the perimeter of a lawn or garden, where the lawn or garden borders sidewalks, driveways, buildings, fences, or other structures. The horizontal member is positioned over the ground or lawn or garden. Most commonly, the horizontal strip will abut the structure which the lawn or garden borders. The split in the split horizontal member is positioned adjacent to the lawn or garden and opposite the sidewalk or other structure, as shown in drawing FIG. 1.

The landscape edging device is fixed to the lawn or garden by one or more gripping members 22,24. The gripping members may extend generally vertically from the horizontal lower flange of the split horizontal member. The gripping members may be of varying lengths and heights, and may be positioned as needed relative to the split horizontal members. The individual gripping member may have one or more arrowhead shaped members 26 or other pointed structures, which facilitate insertion of the device into the ground, while retarding removal of the device.

The device provides a barrier between the device and other vegetation and the structure, such as the driveway, sidewalk 28 or building. The height of the device is insufficient from preventing a mower from traversing the device, and the device does not prevent a hazard of tripping and falling.

While the device is relatively low in height, its height is sufficient to prevent grass and other vegetation from growing over the device due to the split horizontal member. The horizontal member retards dirt from collecting over and around the device, which could facilitate the growth of grass and other vegetation within the device.

The use of the split horizontal member allows the upper leaf to be displaced relative to the lower flange. By allowing such displacement, as a mower traverses over the device, the upper leaf is displaced downwardly toward the lower flange. The overall height of the device is thereby reduced, permitting mowers and other objects to traverse the device. Likewise, if a pedestrian steps on the device, the upper leaf is displaced downwardly and the split horizontal member is reduced in height due to the flexible nature of the upper leaf. The device does not present a hazard when used adjacent to sidewalks and driveways.

The upper leaf is connected at a point, such as at one end of the leaf, to the lower flange, but is not connected to the lower flange 14 on an opposite end 18, although the end 18 of the leaf may contact the lower flange. A split is present between the upper leaf and the lower flange, to allow displacement of the upper leaf relative to the lower flange, as discussed above. An upper leaf having an arcuate shape is preferred, as shown in the drawing figures, wherein the arcuate upper leaf is connected to the lower flange on one end of the arc of the leaf, and the opposite end of the leaf abuts the lower flange along a length of the lower flange. The structure of the device may be such that the upper leaf extends from the point of connection 8, to an additional point of connection 30 to the lower flange.

As the upper leaf is displaced toward the lower flange, the end 18 of the upper leaf traverses along the horizontal lower flange. The movement of the end of the upper leaf as it is displaced pushes away dirt, which may have accumulated on the edge of the lower flange which is adjacent to the lawn, preventing a build-up of dirt which is conducive to the growth of grass or other vegetation on the landscape edging device.

It is preferred that the device be constructed of a resilient material, such as plastic, which will allow displacement of the upper leaf relative to the lower flange. Such resilient plastic materials are also well suited for the device, since such plastic materials tend to be resistant to corrosion and the effects of weather.

What is claimed is:

1. A landscape edging device, comprising:
   a. a split horizontal member which comprises an upper leaf having a first end connected to a generally horizontal lower flange at a connecting point, said upper leaf having a displaceable portion spaced above said lower flange which is capable of downward displacement relative to said lower flange, and wherein said upper leaf has a second end which is biased into contact with said lower flange by said displaceable portion, said horizontal lower flange extending beyond said second end of said upper leaf; and
   b. at least one gripping member which extends from said split horizontal member.

2. A landscape edging device as described in claim 1, wherein said upper leaf has a length and said displaceable portion has an arcuate shape which extends along said length.

3. A landscape edging device as described in claim 2, wherein said at least one gripping member comprises at least two gripping members, each of which extend generally vertically from said lower flange and opposite said upper leaf, wherein said gripping members are of differing heights.

4. A landscape edging device as described in claim 3, wherein said second end of said upper leaf contacts said lower flange along a length of said lower flange, but wherein said second end is not connected to said lower flange.

5. A landscape edging device as described in claim 2, wherein said second end of said upper leaf contacts said lower flange along a length of said lower flange, but wherein said second end is not connected to said lower flange.

6. A landscape edging device as described in claim 1, wherein said at least one gripping member comprises at least two gripping members, each of which extend generally vertically from said lower flange and opposite said upper leaf, wherein said gripping members are of differing heights.

7. A landscape edging device as described in claim 6, wherein said second end of said upper leaf contacts said lower flange along a length of said lower flange, but wherein said second end is not connected to said lower flange.

8. A landscape edging device, comprising:
   a. a split horizontal member which comprises an upper leaf having a first end connected to a generally horizontal lower flange at a connecting point, said upper leaf having a displaceable portion spaced above said lower flange which is capable of downward displacement relative to said lower flange, said upper leaf having a second end which is biased into contact with said lower flange by said displaceable portion along a length of said lower flange, but wherein said second end is not connected to said lower flange; and
   b. at least one gripping member which extends from said split horizontal member.

9. A landscape edging device as described in claim 8, wherein said at least one gripping member comprises at least two gripping members, each of which extend generally vertically from said lower flange and opposite said upper leaf, wherein said gripping members are of differing heights.

10. A landscape edging device as described in claim 9, wherein said upper leaf has a length and said displaceable portion has an arcuate shape which extends along said length.

11. A landscape edging device as described in claim 8, wherein said upper leaf has a length and said displaceable portion has an arcuate shape which extends along said length.

12. A landscape edging device, comprising:
   a. a split horizontal member which comprises an upper leaf having a first end connected to a generally horizontal lower flange at a connecting point, said upper leaf extending generally parallel to said lower flange and having a displaceable portion spaced above said lower flange which is capable of downward displacement relative to said lower flange, and wherein said upper leaf has a second end which, in use, traverses along said lower flange as said upper leaf is displaced downwardly relative to said lower flange; and
   b. at least one gripping member which extends from said split horizontal member.

13. A landscape edging device as described in claim 12, wherein said horizontal lower flange has an edge which extends beyond said second end of said upper leaf.

14. A landscape edging device as described in claim 13, wherein said at least one gripping member comprises at least two gripping members, each of which extend generally from said lower flange and opposite said upper leaf, wherein said gripping members are of differing heights.

15. A landscape edging device as described in claim 12, wherein said at least one gripping member comprises at least two gripping members, each of which extend generally vertically from said lower flange and opposite said upper leaf, wherein said gripping members are of differing heights.

16. A landscape edging device, comprising:

a. a split horizontal member which comprises an upper leaf and a generally horizontal lower flange, wherein said upper leaf extends above said lower flange, and said upper leaf is attached to the landscape edging device at a first end of said upper leaf, and a void is present between said upper leaf and said lower flange, and said upper leaf has a displaceable portion capable of downward displacement relative to said lower flange and a second end biased into contact with said lower flange by said displaceable portion, and, wherein, in use, said displaceable portion is displaced downwardly relative to said lower flange as a force is applied to an upper surface of said upper leaf, and the size of said void is reduced, and said second end moves outwardly along said lower flange; and b. at least one gripping member which extends from said split horizontal member.

17. A landscape edging device as described in claim 16, wherein said horizontal lower flange has an edge which extends beyond said second end of said upper leaf.

18. A landscape edging device as described in claim 17, wherein said at least one gripping member comprises at least two gripping members, each of which extend generally vertically from said lower flange and opposite said upper leaf, wherein said gripping members are of differing heights.

19. A landscape edging device as described in claim 17, wherein said second end of said upper leaf contacts said lower flange along a length of said lower flange, but wherein said second end is not connected to said lower flange.

20. A landscape edging device as described in claim 16, wherein said at least one gripping member comprises at least two gripping members, each of which extend generally vertically from said lower flange and opposite said upper leaf, wherein said gripping members are of differing heights.

21. A landscape edging device as described in claim 20, wherein said second end of said upper leaf contacts said lower flange along a length of said lower flange, but wherein said second end is not connected to said lower flange.

22. A landscape edging device as described in claim 16, wherein said second end of said upper leaf contacts said lower flange along a length of said lower flange, but wherein said second end is not connected to said lower flange.

* * * * *